JAMES B. POLLOCK.  
Improvement in Apparatus for Drying White Lead and other Pulpy Materials.  
No. 122,404. Patented Jan. 2, 1872.
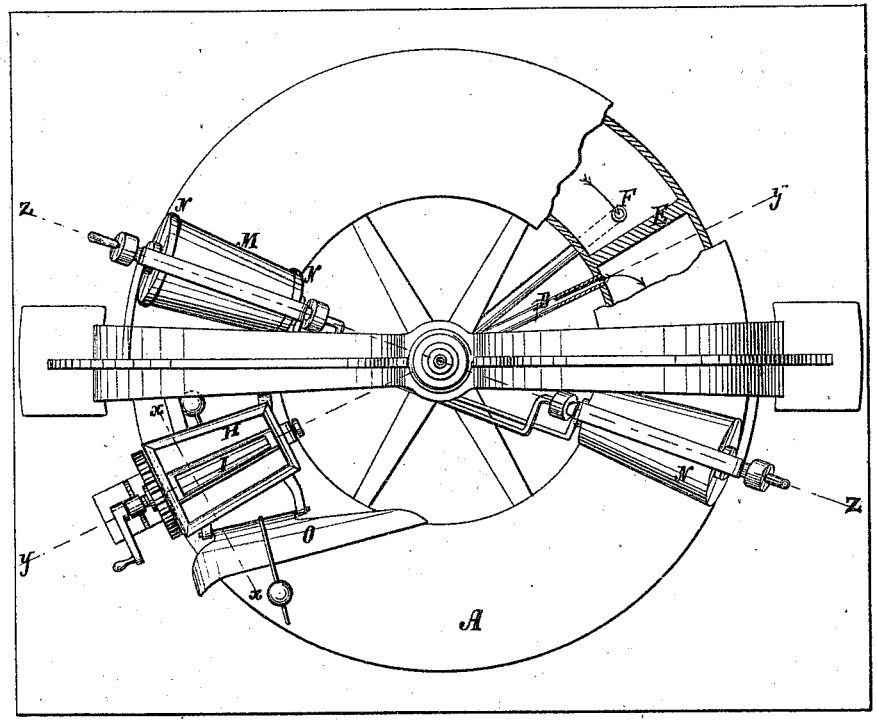
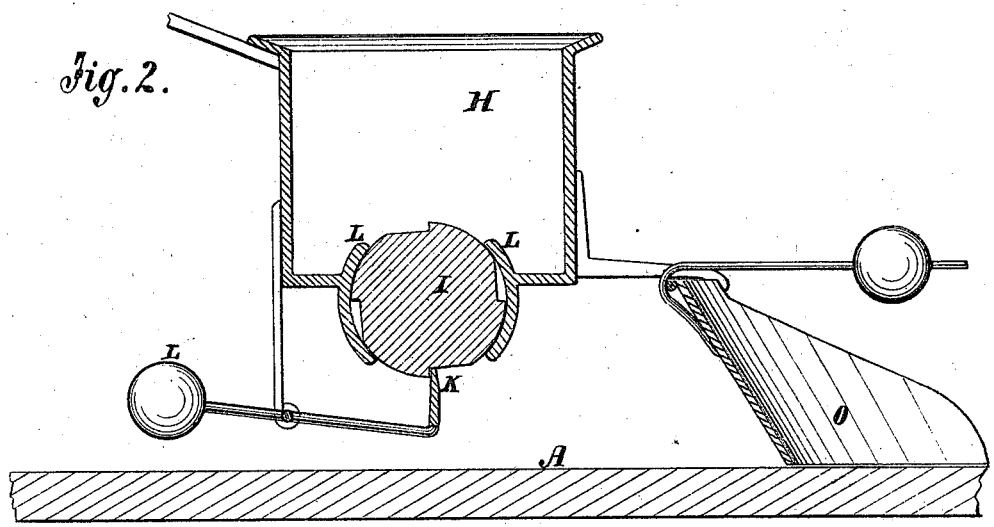
Fig. 2.
Witnesses:  
A Bennecksendorf  
Francis McArdle
Inventor:  
J. B. Pollock  
per Munn & Co.  
Attorneys.

JAMES B. POLLOCK.
Improvement in Apparatus for Drying White Lead and other Pulpy Materials.
No. 122,404.    Patented Jan. 2, 1872.
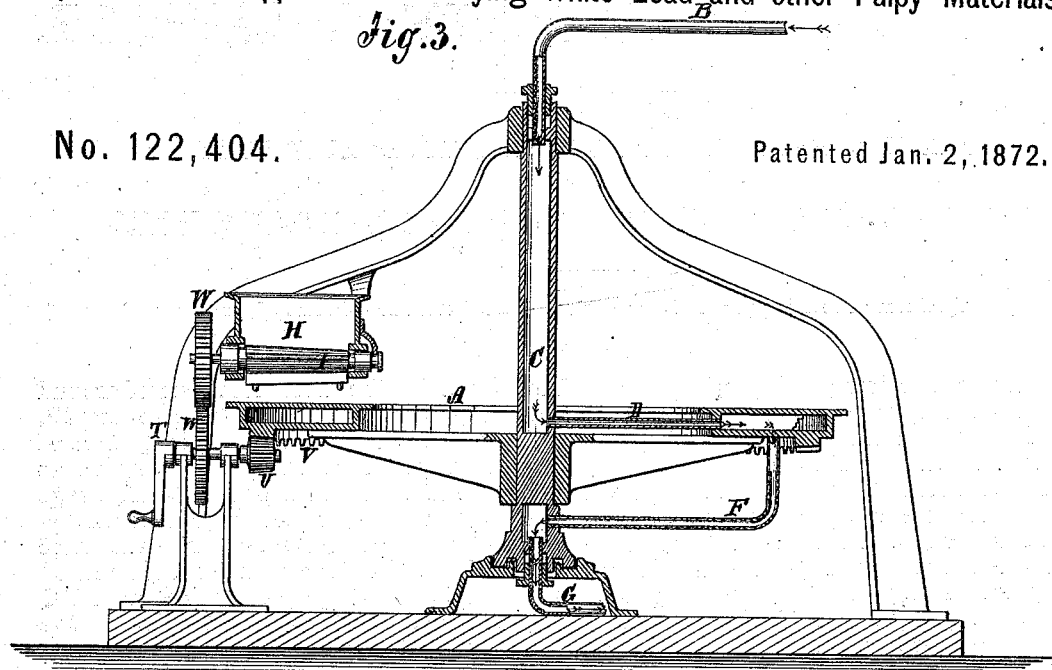
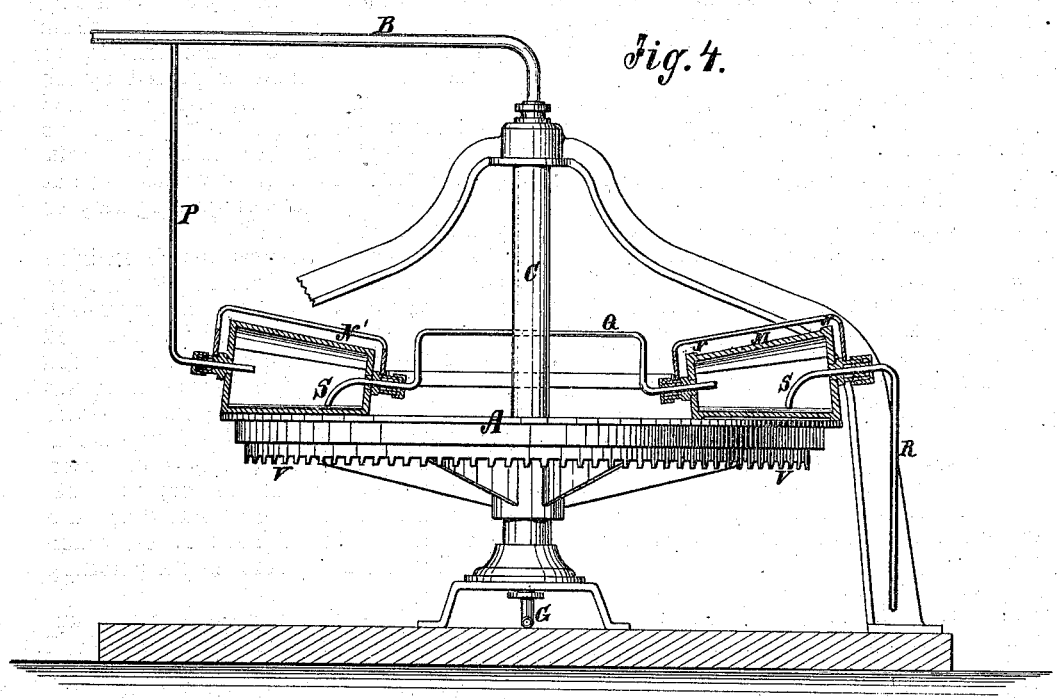

UNITED STATES PATENT OFFICE.

JAMES B. POLLOCK, OF PORT RICHMOND, NEW YORK.

IMPROVEMENT IN APPARATUS FOR DRYING WHITE LEAD AND OTHER PULPY MATERIALS.

Specification forming part of Letters Patent No. 122,404, dated January 2, 1872.

Specification describing a certain Improved Drying-Machine, invented by JAMES B. POLLOCK, of Port Richmond, in the county of Richmond and State of New York.

My invention consists of a horizontal revolving hollow table, a feeding device, one or more hollow heated rollers, and a discharging scraper, all combined and arranged as hereinafter described for drying white lead, whiting, barytes, or other pulpy or semi-fluid substances, the arrangement being such that the said pulpy substances are passed through the apparatus continuously and automatically in such manner that the machine serves as a conveyer from the stock-cistern to the mixing-tub at the same time that it dries the lead, &c.

Figure 1 is a plan view with a part of the table broken out. Fig. 2 is an enlarged section taken on the line $x\,x$, Fig. 1. Fig. 3 is a section on the line $y\,y$ of Fig. 1, and Fig. 4 is a section on the line $z\,z$ of Fig. 1.

A is a large hollow annular horizontally drying-table, to be heated by steam admitted through the pipe B, hollow shaft C, and pipe D, to the hollow space at one side of the dividing-plate E, and exhausted by the pipe F at the other side of said plate, communicating with the lower end of the hollow shaft, from which a pipe, G, conducts the steam away. The substance to be dried is delivered continuously on this table as it revolves slowly from a hopper, H, by means of the grooved feeding-roller I and scraper K at the bottom of said hopper, the said roller revolving between the two sections L of a cylinder, which prevents the escape of any of the substance except what can be carried down in the grooves, and the scraper, which is at the under side of the cylinder, is forced into the grooves, to take out the contents, by a weighted arm, L. The substance being thus delivered upon the table in measured quantities is carried from under the hopper to a hollow heated spreading and drying roller, M, in contact with the table, and having a flange or rim, N, at each end, as high as the required depth of the substance to be dried, which is governed by the amount that can be dried at one revolution of the table, and spreads it evenly thereon, forcing the excess, if any, off at the sides.

After being thus spread over the heated surface of the table the substance is carried around under one or more hollow heated rollers, N', similar to M, with the exception of the flanges N, to a scraper, O, arranged obliquely across the table in front of the hopper H to discharge the dried matter upon the floor, or to a conveyer for carrying it to the grinding-mill. The rollers M and N are heated by steam admitted and exhausted through the axes by pipes P Q R. The pipes which exhaust the steam have the receiving ends bent down to the lowest points within the cylinders, as shown at S, to carry off the water of condensation. The said drying-rollers are supported above the table by any suitable brackets or arms attached to the main frame. The table is turned by the driving-shaft T, which gears with a toothed rim, V, on the under side of it, by the pinion $v$. The feed-roller I is also turned by said shaft, being geared with it by suitable wheels W; but any suitable arrangement of gearing may be employed for turning them.

Heretofore these substances have been dried by one of the following processes: First, upon large stationary pans, upon which they had to be placed and spread on by hand and removed in the same manner. Second, in small earthen pots placed upon shelves in a room kept hot by stoves. Third, in kilns upon tables of tile with heating-flues underneath; or upon stationary tables with steam heat applied underneath. But all these plans are very slow, besides involving the expensive handling, and when done the stuff is in hard cakes, which have to be broken up to feed to the grinding apparatus.

Now, by the use of this automatic feed apparatus, in combination with a rotary table, I save the expense of applying the stuff to be dried to the drier by hand. By the use of a rotary drying apparatus I accomplish the work while the stuff is continuously passing along from the stock-cistern to the mixing-tub, and by the application of heat to the upper side, as well as the lower side of the stream, I not only do the work much quicker, but by drying it in this way the stuff does not cake, being delivered in a pulverized condition, which I attribute to the disturbance of the particles by the water, which is so rapidly expelled when passing under the rollers as to be boiled or converted into steam, which, in escaping, prevents the adhering of the particles.

Of course I may use the revolving drying-table without the heated rollers, using any other means of spreading the pasty matters upon it; or the feeding-roller may have such speed as to deliver the said matters sufficiently even and level on the table; but it is preferable to use said rollers.

Having thus described my invention, I claim as new and desire to secure by Letters Patent—

A drier for white lead and other pulpy substances, consisting of a heated rotary table, A, a feeding apparatus, and a discharging scraper, all arranged to receive, dry, and deliver the said pulpy matters in a continuous operation, substantially as specified.

The combination, with the said heated rotary table, of one or more heated rollers, substantially as specified.

The combination, with the heated rotary table, of a spreading-roller, M, with flanges N, substantially as specified.

The combination of the feed apparatus H I K L, heated rotary table, and one or more heated rollers, M N', substantially as specified.

JAMES B. POLLOCK.

Witnesses:
GEO. W. MABEE,
T. B. MOSHER. (107)